(12) United States Patent
McCloskey

(10) Patent No.: US 10,621,430 B2
(45) Date of Patent: *Apr. 14, 2020

(54) DETERMINING IMAGE FORENSICS USING AN ESTIMATED CAMERA RESPONSE FUNCTION

(71) Applicant: Honeywell International Inc., Morris Plains, NJ (US)

(72) Inventor: Scott McCloskey, Minneapolis, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/912,120

(22) Filed: Mar. 5, 2018

(65) Prior Publication Data

US 2018/0197004 A1 Jul. 12, 2018

Related U.S. Application Data

(63) Continuation of application No. 15/198,810, filed on Jun. 30, 2016, now Pat. No. 9,934,434.

(51) Int. Cl.
| | | |
|---|---|---|
| *G06K 9/00* | (2006.01) | |
| *G06K 9/62* | (2006.01) | |
| *G06T 1/00* | (2006.01) | |
| *H04N 1/32* | (2006.01) | |

(52) U.S. Cl.
CPC ....... *G06K 9/00577* (2013.01); *G06K 9/6202* (2013.01); *G06K 9/629* (2013.01); *G06K 9/6289* (2013.01); *G06T 1/0028* (2013.01); *H04N 1/32128* (2013.01); *G06F 2221/074* (2013.01); *G06K 2009/00583* (2013.01); *G06K 2209/27* (2013.01); *G06T 2201/0201* (2013.01); *H04N 2201/0005* (2013.01); *H04N 2201/3235* (2013.01); *H04N 2201/3252* (2013.01); *H04N 2201/3257* (2013.01)

(58) Field of Classification Search
None
See application file for complete search history.

(56) References Cited

U.S. PATENT DOCUMENTS

| | | |
|---|---|---|
| 7,505,606 B2 | 3/2009 | Lin et al. |
| 7,539,331 B2 | 5/2009 | Wendt et al. |
| 9,031,329 B1 * | 5/2015 | Farid .................. G06K 9/00577 |
| | | 382/209 |

(Continued)

OTHER PUBLICATIONS

Detecting Doctored Images Using Camera Response Normality adn Consistency. Lint et al. IEEE Jun. 2005.*

(Continued)

*Primary Examiner* — Delomia L Gilliard
(74) *Attorney, Agent, or Firm* — Alston & Bird LLP

(57) ABSTRACT

An image forensics system estimates a camera response function (CRF) associated with a digital image, and compares the estimated CRF to a set of rules and compares the estimated CRF to a known CRF. The known CRF is associated with a make and a model of an image sensing device. The system applies a fusion analysis to results obtained from comparing the estimated CRF to a set of rules and from comparing the estimated CRF to the known CRF, and assesses the integrity of the digital image as a function of the fusion analysis.

20 Claims, 3 Drawing Sheets

(56) References Cited

U.S. PATENT DOCUMENTS

| | | | |
|---|---|---|---|
| 2004/0264732 A1* | 12/2004 | Tian | G06T 1/0028 382/100 |
| 2006/0262973 A1 | 11/2006 | Lin et al. | |
| 2009/0290752 A1 | 11/2009 | Kalva | |
| 2010/0265320 A1 | 10/2010 | Treado et al. | |
| 2012/0087589 A1 | 4/2012 | Chang-tsun et al. | |
| 2013/0308858 A1 | 11/2013 | Xu et al. | |
| 2014/0376812 A1 | 12/2014 | Kawazu | |
| 2015/0213324 A1 | 7/2015 | Farid et al. | |
| 2018/0005032 A1* | 1/2018 | McCloskey | G06T 1/0028 |
| 2018/0137115 A1* | 5/2018 | Klein | G06F 16/313 |

OTHER PUBLICATIONS

Digital Image Authenication From JPEG Headers. Kee et al. IEEE Sep. 2011.*

Statistical Fusion of Multiple Cues for Image Tampering Detection. Hsu et al, IEEE Oct. 2008.*

Office Action for European Application No. 17177486.2, dated Apr. 18, 2019, 5 pages.

"Application Serail No. 15/198, Preliminary Amendment filed Aug. 2, 2017", 3 pgs.

"U.S. Appl. No. 15/198,810, Notice of Allowability dated Dec. 19, 2017", 2 pgs.

"U.S. Appl. No. 15/198,810, Notice of Allowance dated Nov. 29, 2017", 9 pgs.

"European Application Serial No. 17177486.2, Extended European Search Report dated Oct. 24, 2017", 10 pgs.

Farid, Hany, "Image Forgery Detection—A Survey", IEEE Signal Processing Magazine, (Mar. 2009), 16-25.

Goljan, Miroslav, et al., "Large Scale Test of Sensor Fingerprint Camera Identification", Proc. SPIE 7254, Media Forensics and Security, 725401, IS&T/SPIE Electronic Imaging, 2009, San Jose, California, (2009), 13 pgs.

Hsu, Yu-Feng, et al., "Camera Response Functions for Image Forensics: An Automatic Algorithm for Splicing Detection", IEEE Transactions on Information Forensics and Security, 5(4), (Dec. 2010), 816-825.

Hsu, Yu-Feng, et al., "Detecting Image Splicing Using Geometry Invariants and Camera Characteristics Consistency", 2006 IEEE International Conference on Multimedia and Expo, (Jul. 2006), 549-552.

Hsu, Yu-Feng, et al., "Image Splicing Detection Using Camera Response Function Consistency and Automatic Segmentation", ICME, (Jul. 1, 2007), 28-31.

Hsu, Yu-Feng, et al., "Statistical Fusion of Multiple Cues for Image Tampering Detection", 2008 42nd Asilomar Conference on Signals, Systems and Computers, (Oct. 2008), 5 pgs.

Kee, Eric, et al., "Digital Image Authentication From JPEG Headers", IEEE Transactions on Information Forensics and Security, 6(3), (Sep. 2011), 1066-1075.

Lin, Zhouchen, et al., "Detecting Doctored Images Using Camera Response Normality and Consistency", 2005 IEEE Computer Society Conference on Computer Vision and Pattern Recognition (CVPR'05), San Diego, CA], IEEE, Piscataway, NJ, USA, vol. 1, (Jun. 20, 2005), 1087-1092.

Rocha, Anderson, et al., "Vision of the Unseen: Current Trends and Challenges in Digital Image and Video Forensics", ACM Computing Surveys, 3(4), Article No. 26, (Oct. 2011), 1-42.

Zhang, Pin, et al., "Detecting Image Tampering Using Feature Fusion", IEEE 2009 International Conference on Availability, Reliability and Security, Mar. 16-19, 2009, (2009), 335-340.

* cited by examiner

DETERMINING IMAGE FORENSICS USING AN ESTIMATED CAMERA RESPONSE FUNCTION

RELATED APPLICATIONS

This application is a continuation of and claims priority to U.S. application Ser. No. 15/198,810, filed on Jun. 30, 2016, the contents of which are incorporated herein by reference.

TECHNICAL FIELD

The present disclosure relates to determining image forensics using an estimated camera response function.

BACKGROUND

Determining the integrity of digital media is of increasing importance due to the proliferation of both real and forged imagery on social media platforms. It is easier than ever to use manipulation programs (e.g., Photoshop) to alter the content of an image in order to misinform the public or to commit fraud. As such, there is a need for methods to assess the integrity of imagery in both the commercial and government sectors. These methods must work with uncontrolled source imagery and produce, with as little user input as possible, a numerical assessment of the probability that the image or video has been altered in such a way as to misinform or mislead the recipient.

In the government sector, DARPA has launched a program called MediFor (Media Forensics) to assess the integrity of visual media used by intelligence analysts for enemy force assessment, counter-intelligence, and to debunk misinformation from foreign intelligence services.

In the commercial realm, the ubiquity of digital cameras in mobile phones and other devices has made the assessment of integrity increasingly important. Insurance adjusters have traditionally been a user of prior art digital image integrity assessment in order to assess whether images of a car before or after an accident have been altered to exaggerate or understate damage. Other industries such as the parcel delivery industry have exhibited an interest in the use of digital imagery to document the condition of a parcel when it comes into their custody, and have similar concerns about the veracity of customer-provided imagery.

DETAILED DESCRIPTION

Figure 1A:
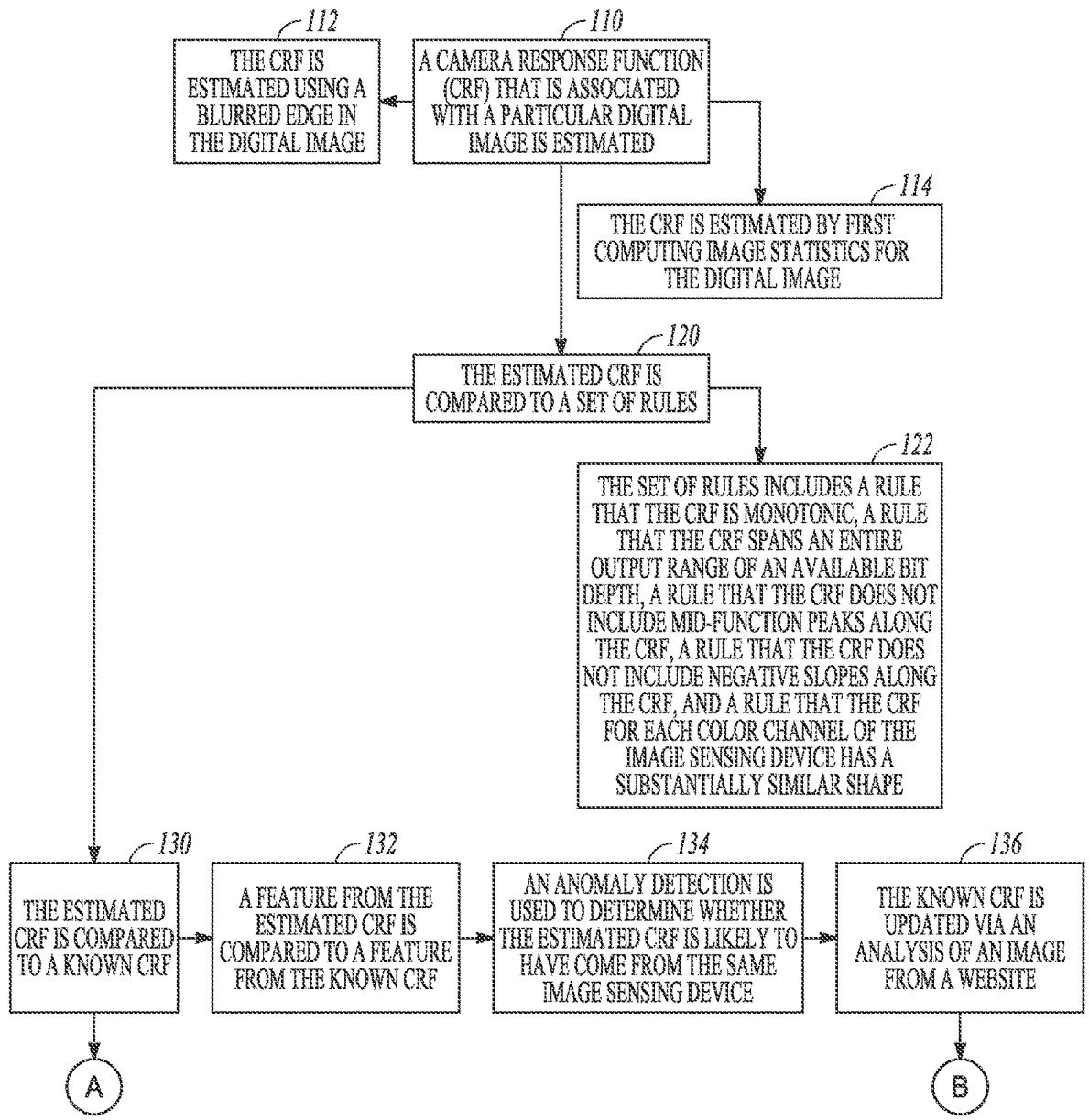
FIGS. 1A and 1B are a block diagram illustrating features and operations of a method and system for determining image forensics using an estimated camera response function.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

In an embodiment, a method of image forensics uses blur to estimate certain camera parameters, and checks those parameters for consistency, at least, with a set of rules (both manually encoded and empirically determined) which can detect manipulations without the need to access image metadata (JPEG or EXIF data, for example). In addition, when metadata is present and/or inferred using other means, more exacting checks can be applied to detect whether the parameters are consistent with the purported make and model of the camera.

The specific parameter estimated and checked in this method is the camera response function (CRF), also known as the tone-mapping function. The CRF is a non-linear mapping from the photosensor's output to an intensity value (often an 8-bit value) used in the corresponding pixel of the resulting image. CRFs are used to improve the aesthetics of photographic imagery, since the raw photosensor response results in unpleasantly low contrast and harsh transitions at the ends of the dynamic range. Because the CRF's main goal is aesthetic, there is no objectively best value and thus each manufacturer uses its own proprietary CRF. To the extent that different camera models target different customer segments, CRFs exhibit variation even between models produced by the same manufacturer. The role of CRFs with respect to blur has only recently become well-known in the image processing and computer vision literature.

Whereas blur has been used previously for image forensics, the prior art depends on an unacceptably high degree of user input and performs relative comparisons which increase the error of the resulting estimate. By contrast, methods to estimate the CRF from a natural (i.e., not contrived) image exist, and the estimated CRF can be compared to both a set of general rules and a database of known CRFs. One such database already exists, but part of the present invention is the idea of a living database updated by occasionally downloading and analyzing imagery from social media sites such as Flickr, Pintrest, etc.

In an embodiment, assessing the forensic integrity of an image or video begins by estimating the CRF. This can be done in several ways. The first, which is based on prior art, is to estimate the CRF via blurred edges in the image. An alternate method is to use image statistics, e.g. by computing the magnitudes of image gradients and modeling their distribution in relation to an a priori model of natural image gradient magnitudes.

Once the CRF is estimated, several analyses are applied. First, the estimated CRF is compared to some rules from domain knowledge, e.g. that the CRF should be monotonic and that it should span the entire output range of the available bit depth. Second, the CRF is compared to a database of known CRFs, and features derived from both the current and database CRFs are compared using anomaly detection methods to determine whether the estimated CRF is likely to have come from the same space. Third, in the event that metadata are available purporting to document the camera's make and model, the estimated CRF is compared to the corresponding entry from the database to check for consistency. The outputs of these three modules are then combined via a fusion approach for an overall integrity assessment.

The maintenance of a CRF database can be important to the performance of the image forensics system. In an embodiment, in light of the changes to the CRF space as new cameras are released, a CRF database is maintained via periodic analysis of imagery uploaded to social media sites. For example, Flickr has an application program interface (API) that allows this functionality of downloading a set of photos. In a first step, a set of recently uploaded images would be downloaded and the corresponding metadata would be checked to make a list of current camera makes and models. For any make or model where there is not a CRF in the database, the system would download a second set of photos taken with that particular camera. This second set of photos would then be processed to estimate a representative CRF for the camera make and model, and it would be added to the database.

Figure 1B:
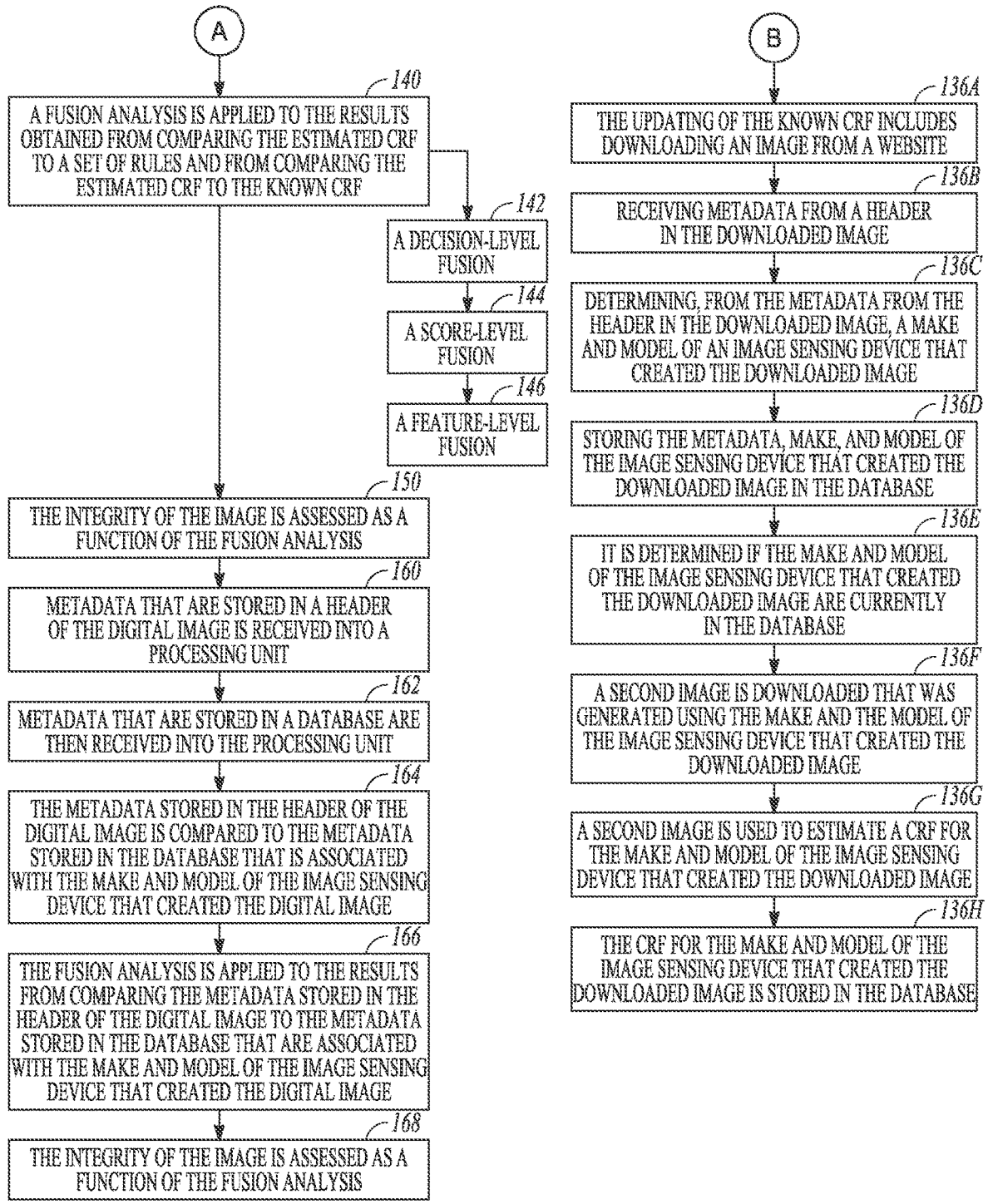

FIGS. 1A and 1B are a block diagram illustrating features and operations of a method for determining image forensics using an estimated camera response function. FIGS. 1A and 1B include a number of process blocks 110-168. Though arranged somewhat serially in the example of FIGS. 1A and 1B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring specifically to FIGS. 1A and 1B, at 110, a camera response function (CRF) that is associated with a particular digital image is estimated. As indicated at 112, the CRF can be estimated using a blurred edge in the digital image. Specifically, the change in image intensity across a motion-blurred edge would be linear in the absence of the CRF. The observed non-linearity of the blurred edge in the digital image can thus be used with a numerical optimization method to estimate the CRF. In under-constrained situations, prior information about the blur or the CRF shape can be imposed during optimization. In another embodiment, as indicated beginning at 114, the CRF is estimated by first computing image statistics for the digital image. Pertinent image statistics can be divided into spatial and frequency domain statistics. Spatial domain statistics, for example, include histograms of image gradient magnitudes which, in the absence of blur and the CRF, have a known distribution; as with edge methods, numerical optimization can be used to determine the CRF which best explains the difference between the observed and expected image statistics. Fourier domain statistics, for example, include the radial power spectrum of the image which, in the absence of blur and the CRF, have an expected falloff with the magnitude of the spatial frequency; as before, numerical optimization can estimate the CRF which best explains the difference between the observed and expected power spectra.

Figure 2:
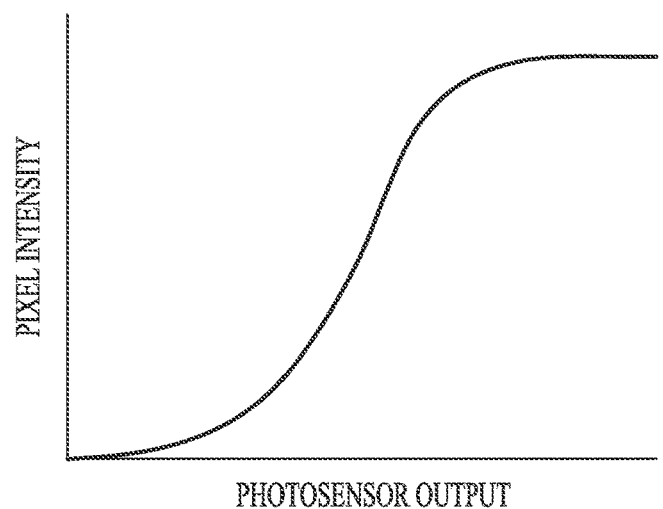
FIG. 2 illustrates an example of a camera response function (CRF).
Figure 3:
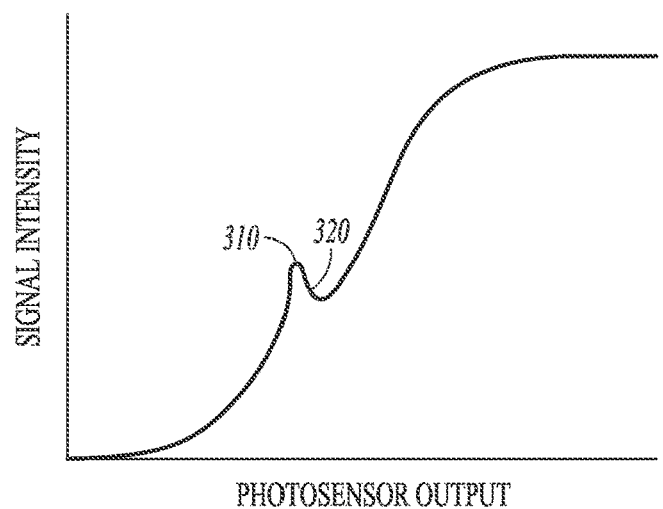
FIG. 3 illustrates an example of a camera response function that includes anomalies such as mid-function peaks and negative slopes.

After the estimation of the CRF, at 120, the estimated CRF is compared to a set of rules. As indicated at 122, the set of rules can include a rule that the CRF is monotonic, a rule that the CRF spans an entire output range of an available bit depth, a rule that the CRF does not include mid-function peaks along the CRF, a rule that the CRF includes no negative slopes along the CRF, and a rule that the CRF for each color channel of the image sensing device has a substantially similar shape. To illustrate, FIG. 2 illustrates a typical CRF associated with a digital image that has not been tampered with. In contrast, FIG. 3 illustrates a CRF in which the pixels in the image have been altered. As can be seen in FIG. 2, a normal CRF comprises a relatively smooth positively increasing slope along its length. As illustrated in FIG. 3 at 310, an altered digital image may cause the CRF to have minor peaks along the length of the CRF, and also cause the CRF to have negative slopes along the length of the CRF (320).

At 130, the estimated CRF is compared to a known CRF. The known CRF is associated with a particular make and a model of a particular image sensing device. The estimated and known CRFs can be compared in different ways. First, they can be compared directly, for instance by measuring the difference between them at corresponding points and computing a root mean squared difference. Alternatively, CRFs can be compared via features. More specifically, as outlined at 132, a feature from the estimated CRF is compared to a feature from the known CRF. Such features for comparison can include a histogram of slope values along the CRF, a measured area under the curve, and the start- and end-points of the middle linear section. Then, at 134, an anomaly detection is used to determine whether the estimated CRF is likely to have come from the same image sensing device. As a practical matter, large sets of CRFs are used in anomaly detection so as to increase the accuracy of the detection process.

As indicated at 136, the known CRF is updated via an analysis of an image from a website. More specifically, this updating of the known CRF includes downloading an image from a website (136A), receiving metadata from a header in the downloaded image (136B), determining, from the metadata from the header in the downloaded image a make and model of an image sensing device that created the downloaded image (136C), and storing the metadata, make, and model of the image sensing device that created the downloaded image in the database (136D). In a further embodiment, at 136E, it is determined if the make and model of the image sensing device that created the downloaded image are currently in the database. If not, at 136F, a second image is downloaded that was generated using the make and the model of the image sensing device that created the downloaded image. Then, at 136G, the second image is used to estimate a CRF for the make and model of the image sensing device that created the downloaded image, and at 136H, the CRF for the make and model of the image sensing device that created the downloaded image is stored in the database.

At 140, a fusion analysis is applied to the results obtained from comparing the estimated CRF to a set of rules and from comparing the estimated CRF to the known CRF. In an embodiment, a fusion analysis can involve one or more of the following methods. A decision-level fusion, for example voting, where different cues are used to independently predict something (such as that an image has been forged), and those binary decisions are combined. A common option is to take a majority vote by the independent predictions. A score-level fusion, where each of the independent features is used to predict a continuous score (conceptually, the probability that the image was forged) and those continuous scores are fused to generate a single system output, which is a binary indicator of whether the image was forged. A feature-level fusion, where lower-level features (for example, something like the derivatives of the CRF in different places) are combined (for example, by concatenating them), and a single machine learning method is applied to the concatenated feature vector to predict whether the image was forged. Thereafter, at 150, the integrity of the image is assessed as a function of the fusion analysis.

In yet another embodiment, as indicated at 160, metadata that is stored in a header of the digital image is received into a processing unit. As is the case with typical header data, the metadata stored in the header of the digital image identifies a make and a model of an image sensing device that created the digital image. At 162, metadata that are stored in a database are then received into the processing unit. The metadata stored in the database are associated with the make and model of the image sensing device that created the digital image. At 164, the metadata stored in the header of the digital image is compared to the metadata stored in the database that is associated with the make and model of the image sensing device that created the digital image. At 166, the fusion analysis is applied to the results from comparing the metadata stored in the header of the digital image to the metadata stored in the database that are associated with the make and model of the image sensing device that created the digital image, and at 168, the integrity of the image is assessed as a function of the fusion analysis.

Figure 4:
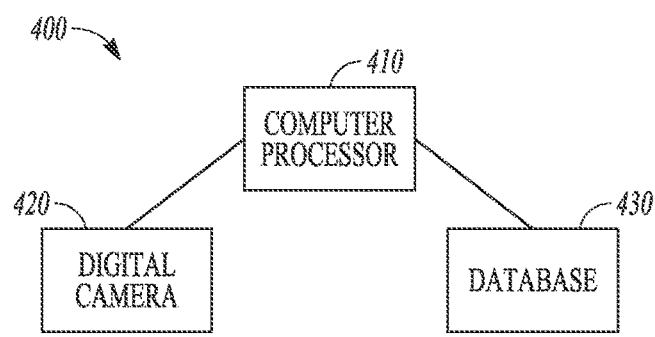
FIG. 4 is a block diagram illustrating a system including a digital camera, a computer processor, and a database.

FIG. 4 is a block diagram illustrating a system 400 including a digital camera 420, a computer processor 410, and a database 430. The system 400 can be used to execute the several functions outlined in FIGS. 1A and 1B.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process to assess integrity in a digital image comprising:
   estimating a camera response function (CRF) associated with the digital image by computing a plurality of magnitudes of image gradients and modeling distribution in relation to a priori model of natural image gradient magnitudes;
   comparing the estimated CRF to a set of rules;
   receiving metadata stored in a header of the digital image, the metadata stored in the header of the digital image identifying a make and a model of an image sensing device that created the digital image;
   receiving metadata stored in a database, the metadata stored in the database associated with the make and model of the image sensing device that created the digital image;
   comparing the metadata stored in the header of the digital image to the metadata stored in the database that is associated with the make and model of the image sensing device that created the digital image;
   applying a fusion analysis to results obtained from comparing the estimated CRF to a set of rules and from comparing the metadata stored in the header of the digital image to the metadata stored in the database that is associated with the make and model of the image sensing device that created the digital image; and
   assessing the integrity of the image as a function of the fusion analysis.

2. The process of claim 1, wherein the estimated CRF is estimated using a blurred edge in the digital image.

3. The process of claim 1, comprising computing image statistics for the digital image, the image statistics to be used with optimization methods to infer the CRF.

4. The process of claim 3, wherein the image statistics are computed in the spatial domain.

5. The process of claim 3, wherein the image statistics are computed in a Fourier domain.

6. The process of claim 1, wherein the set of rules comprises a rule that the CRF is monotonic, a rule that the CRF spans an entire output range of an available bit depth, that the CRF comprises no mid-function peaks along the CRF, that the CRF comprises no negative slopes, that the CRF comprises no mid-function zero slopes, and that a CRF for each color channel of the image sensing device has a substantially similar shape.

7. The process of claim 1, wherein the fusion analysis comprises one or more of a decision-level fusion, a score-level fusion, and a feature-level fusion.

8. A process to assess integrity in a digital image comprising:
   estimating a camera response function (CRF) associated with the digital image by computing a plurality of magnitudes of image gradients and modeling distribution in relation to a priori model of natural image gradient magnitudes;
   comparing the estimated CRF to a set of rules;
   applying a fusion analysis to results obtained from comparing the estimated CRF to a set of rules; and
   assessing the integrity of the digital image as a function of the fusion analysis.

9. The process of claim 8, comprising:
   receiving metadata stored in a header of the digital image, the metadata stored in the header of the digital image identifying a make and a model of an image sensing device that created the digital image;
   receiving metadata stored in a database, the metadata stored in the database associated with the make and model of the image sensing device that created the digital image;
   comparing the metadata stored in the header of the digital image to the metadata stored in the database that is associated with the make and model of the image sensing device that created the digital image;
   applying the fusion analysis to results obtained from comparing the metadata stored in the header of the digital image to the metadata stored in the database that is associated with the make and model of the image sensing device that created the digital image; and
   assessing the integrity of the digital image as a function of the fusion analysis.

10. The process of claim 8, wherein the estimated CRF is estimated using a blurred edge in the digital image.

11. The process of claim 8, comprising computing image statistics for the digital image, the image statistics to be used with optimization methods to infer the CRF; wherein the image statistics are computed in the spatial domain or the image statistics are computed in the Fourier domain.

12. The process of claim 8, wherein the set of rules comprises a rule that the CRF is monotonic, a rule that the CRF spans an entire output range of an available bit depth, that the CRF comprises no mid-function peaks along the CRF, that the CRF comprises no negative slopes, that the CRF comprises no mid-function zero slopes, and that the CRF for each color channel of the image sensing device has a substantially similar shape; and wherein the fusion analysis comprises one or more of a decision-level fusion, a score-level fusion, and a feature-level fusion.

13. An image forensics system comprising:
one or more processors; and
a computer readable medium storing instructions that, when executed by the one or more processors, cause the system to perform operations comprising:
 estimating a camera response function (CRF) associated with a digital image by computing a plurality of magnitudes of image gradients and modeling distribution in relation to a priori model of natural image gradient magnitudes;
 comparing the estimated CRF to a set of rules;
 applying a fusion analysis to results obtained from comparing the estimated CRF to a set of rules; and
 assessing the integrity of the digital image as a function of the fusion analysis.

14. The image forensics system of claim 13, comprising:
receiving metadata stored in a header of the digital image, the metadata stored in the header of the digital image identifying a make and a model of an image sensing device that created the digital image;
receiving metadata stored in a database, the metadata stored in the database associated with the make and model of the image sensing device that created the digital image;
comparing the metadata stored in the header of the digital image to the metadata stored in the database that is associated with the make and model of the image sensing device that created the digital image;
applying the fusion analysis to results obtain from comparing the metadata stored in the header of the digital image to the metadata stored in the database that is associated with the make and model of the image sensing device that created the digital image; and
assessing the integrity of the digital image as a function of the fusion analysis.

15. The image forensics system of claim 13, wherein the estimated CRF is estimated using a blurred edge in the digital image.

16. The image forensics system of claim 13, comprising computing image statistics for the digital image, the image statistics being computed in the spatial or Fourier domain; and
 wherein the estimated CRF is estimated by numerical optimization to explain the difference between observed and expected statistics.

17. The image forensics system of claim 13, wherein the set of rules comprises a rule that the CRF is monotonic, a rule that the CRF spans an entire output range of an available bit depth, that the CRF comprises no mid-range peaks along the CRF, that the CRF comprises no negative slopes, that the CRF comprises no mid-function zero slopes, and that a CRF for each color channel of the image sensing device has a substantially similar shape.

18. The image forensics system of claim 13, comprising instructions for computing image statistics for the digital image, the image statistics to be used with optimization methods to infer the CRF.

19. The image forensics system of claim 18, wherein the image statistics are computed in the spatial domain or the image statistics are computed in a Fourier domain.

20. The image forensics system of claim 13, wherein the fusion analysis comprises one or more of a decision-level fusion, a score-level fusion, and a feature-level fusion.

* * * * *